United States Patent
Otake

(10) Patent No.: US 8,440,773 B2
(45) Date of Patent: May 14, 2013

(54) STIMULUS-RESPONSIVE COMPOUND, ACTUATOR, AND STIMULUS-RESPONSIVE COMPOUND PRODUCING PROCESS

(75) Inventor: Toshihiro Otake, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 41 days.

(21) Appl. No.: 13/192,933

(22) Filed: Jul. 28, 2011

(65) Prior Publication Data

US 2012/0046431 A1 Feb. 23, 2012

(30) Foreign Application Priority Data

Aug. 17, 2010 (JP) ................. 2010-182171

(51) Int. Cl.
*C08F 228/06* (2006.01)
(52) U.S. Cl.
USPC .......................................... 526/256; 549/32
(58) Field of Classification Search ............... 526/256; 549/32
See application file for complete search history.

(56) References Cited

U.S. PATENT DOCUMENTS 7,122,598 B2 * 10/2006 Naciri et al. .................. 525/63
2006/0252906 A1 * 11/2006 Godschalx et al. ............. 528/86

FOREIGN PATENT DOCUMENTS

JP   A-2005-224027   8/2005

OTHER PUBLICATIONS

Greve, Andreas and Heino Finkelmann, "Nematic Elastomers: The Dependence of Phase Transformation and Orientation Processes on Crosslinking Topology", 2001, Macromol. Chem Phys 2002, 2926-2946.*
Ohta, Akira et al., "Synthesis and Properties of Novel Bis (1,3-Benzoithiolium)-Type Dications Containing a Biaryl Unit: New Redox Systems Undergoing Reversible Changes by Electron Transfer", 2006, Heterocycles, vol. 69, p. 365-375.*

* cited by examiner

*Primary Examiner* — Ling Choi
*Assistant Examiner* — David L Miller
(74) *Attorney, Agent, or Firm* — Oliff & Berridge, PLC

(57) ABSTRACT

A stimulus-responsive compound includes a pair of alkyl chains; a crosslinking portion that crosslinks the pair of alkyl chains; and a liquid-crystalline functional group attached to at least one of the alkyl chains. The crosslinking portion includes: a unit A that has a bond that serves as a rotational axis, a first group positioned at one end of the bond, and a second group positioned at the other end of the bond, a first unit B disposed at a first bonding site of the first group, and a second unit B disposed at a first bonding site of the second group. The first unit B and the second unit B are capable of forming a bond between each other through redox reaction.

10 Claims, 2 Drawing Sheets

STIMULUS-RESPONSIVE COMPOUND, ACTUATOR, AND STIMULUS-RESPONSIVE COMPOUND PRODUCING PROCESS

The entire disclosure of Japanese Patent Application No. 2010-182171, filed Aug. 17, 2010 is expressly incorporated by reference herein.

BACKGROUND

1. Technical Field

The present invention relates generally to the filed of stimulus-responsive compounds, actuators, and stimulus-responsive compound producing processes.

2. Related Art

There is an increasing need for small actuators in the field of, for example, medicine and micromachines.

In addition to being required to be small sized, such actuators also need to be driven at low voltage. In this connection, many attempts have been made to realize low voltage driving (see, for example, JP-A-2005-224027).

However, a sufficiently low driving voltage has not been realized in the actuators of the related art, and high voltage is still needed to attain desired deformation.

SUMMARY

An advantage of some aspects of the invention is to provide a stimulus-responsive compound that can undergo deformation (displacement) at low voltage, an actuator that uses such a stimulus-responsive compound, and a process for producing such stimulus-responsive compounds.

According to an aspect of the invention, there is provided a stimulus-responsive compound that includes:

a pair of alkyl chains;

a crosslinking portion that crosslinks the pair of alkyl chains; and a liquid-crystalline functional group attached to at least one of the alkyl chains, the crosslinking portion including:

a unit A that has a bond that serves as a rotational axis, a first group positioned at one end of the bond, and a second group positioned at the other end of the bond, a first unit B disposed at a first bonding site of the first group, and a second unit B disposed at a first bonding site of the second group, the crosslinking portion being attached to one of the alkyl chains at a second bonding site of the first group, and to the other alkyl chain at a second bonding site of the second group, the first unit B and the second unit B being capable of forming a bond between each other through redox reaction.

In this way, a stimulus-responsive compound can be provided that can deform at low voltage.

It is preferable in the stimulus-responsive compound that the unit A be one selected from the group consisting of the following formulae (1), (2), and (3).

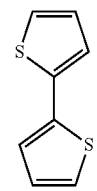

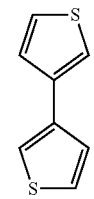

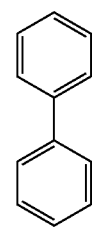

In this way, the stimulus-responsive compound can undergo deformation (displacement) more smoothly, and can be driven at lower voltage.

It is preferable in the stimulus-responsive compound that the first unit B and the second unit B be each represented by the following formula (4).

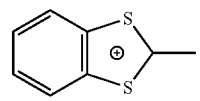

In this way, the units B can easily switch between the bonded state and the non-bonded state in a reversible fashion under adjusted reaction conditions. Further, because of high reactivity, the stimulus-responsive compound can undergo deformation even more smoothly at even lower voltage.

It is preferable in the stimulus-responsive compound that the liquid-crystalline functional group have a plurality of ring structures.

In this way, the stimulus-responsive compound can have certain driving directivity.

It is preferable in the stimulus-responsive compound that one or more halogen atoms be attached to one of the plurality of ring structures.

This improves the kinetic performance of the liquid-crystalline functional group during orientation, and thus increases the transition rate of orientation. As a result, the stimulus-responsive compound can undergo deformation (displacement) even more quickly and smoothly, and can thus be driven at even lower voltage.

According to another aspect of the invention, there is provided an actuator produced by using the stimulus-responsive compound of the aspect of the invention.

In this way, an actuator can be provided that can deform at low voltage.

According to still another aspect of the invention, there is provided a process for producing a stimulus-responsive compound, the process including copolymerizing a first monomer and a second monomer, the first monomer including:

a unit A that includes a bond that serves as a rotational axis, a first group positioned at one end of the bond, and a second group positioned at the other end of the bond, a first unit B disposed at a first bonding site of the first group, a second unit B disposed at a first bonding site of the second group, and a polymerizable functional group attached to a second bonding site of the first group, and to a second bonding site of the second group, the second monomer including a liquid-crystalline functional group, and at least one polymerizable functional group.

In this way, a stimulus-responsive compound can be provided that has a high deformation rate, and that can undergo directional deformation.

It is preferable in the process that the polymerizable functional group be selected from the group consisting of a vinyl group, an acryl group, and a methacryl group.

In this way, a stimulus-responsive compound can easily be obtained. Further, the product stimulus-responsive compound can have improved mobility, and an increased extent of deformation (deformation rate).

BRIEF DESCRIPTION OF THE DRAWINGS

The invention will be described with reference to the accompanying drawings, wherein like numbers reference like elements.

DESCRIPTION OF EXEMPLARY EMBODIMENTS

A preferred embodiment of the invention is described below.

Stimulus-Responsive Compound

First, a preferred embodiment of the stimulus-responsive compound of the invention is described in detail.

The stimulus-responsive compound refers to a compound that functions to undergo molecular deformation (displacement) in response to stimuli, specifically, a compound that constitutes the driving unit of devices such as actuators and micropumps.

Figure 1A:
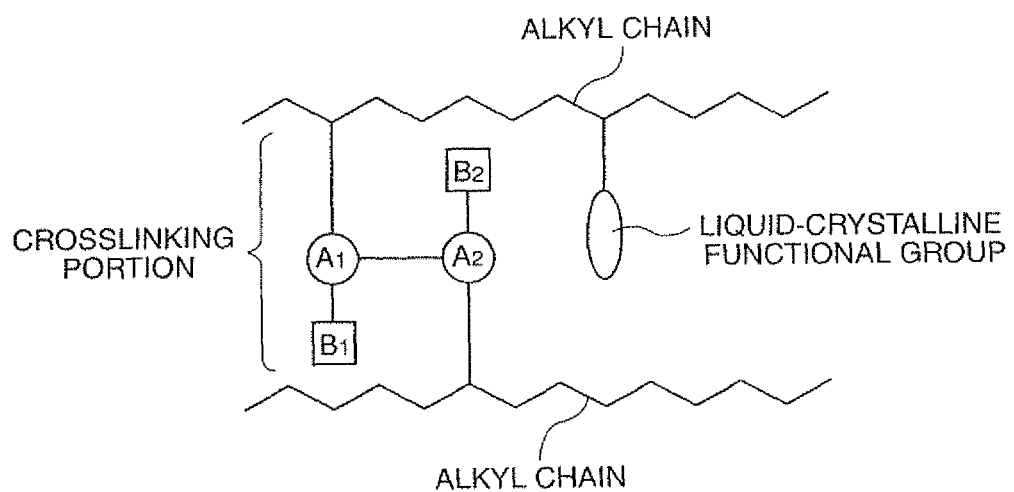
FIGS. 1A and 1B are diagrams explaining the molecular structure of a stimulus-responsive compound of an embodiment of the invention before and after a redox reaction.
Figure 1B:
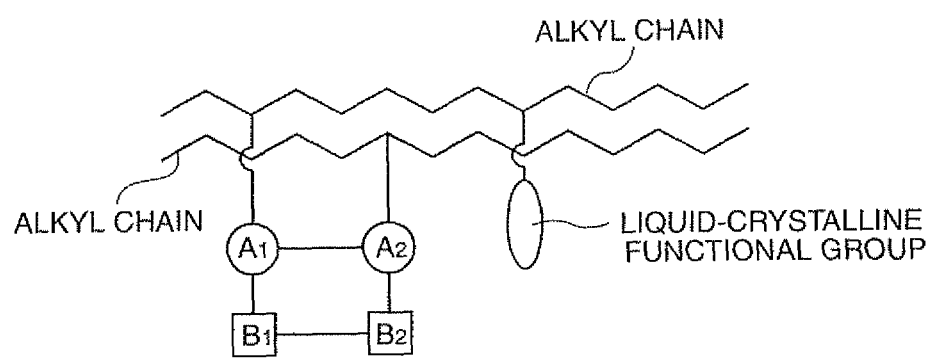

FIGS. 1A and 1B are diagrams explaining the molecular structure of the stimulus-responsive compound of the embodiment of the invention before and after a redox reaction. In FIGS. 1A and 1B, the open circle and open square represent functional groups, and the line represents a bond.

As illustrated in FIG. 1A, the stimulus-responsive compound of the present embodiment includes a pair of alkyl chains, a crosslinking portion that crosslinks the alkyl chains, and a liquid-crystalline functional group attached to one of the alkyl chains. For clarity, the figure shows only one crosslinking portion and only one liquid-crystalline functional group. In practice, however, more than one crosslinking portion and more than one liquid-crystalline functional group are present.

As illustrated in FIG. 1A, the crosslinking portion includes: a unit A that has a bond that serves as a rotational axis, a first group positioned at one end of the bond ($A_1$ in the figure), and a second group positioned at the other end of the bond ($A_2$ in the figure); a first unit B disposed at a first bonding site of the first group ($B_1$ in the figure); and a second unit B disposed at a first bonding site of the second group ($B_2$ in the figure).

The unit A has the bond that serves as a rotational axis. The first group and the second group are attached to the both ends of the bond, and are rotatable about the axis bond. The stimulus-responsive compound is deformable (displaceable) with these units.

The unit A may be, for example, a group that includes two aromatic rings bound to each other, and is preferably a group selected from the group consisting of formulae (1) to (3) below. With these groups used as unit A, the stimulus-responsive compound can undergo deformation (displacement) more smoothly, and can be driven at lower voltage.

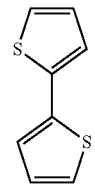

(1)

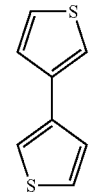

(2)

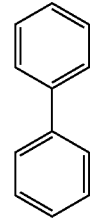

(3)

As illustrated in FIG. 1A, the first unit B is attached to the first bonding site of the first group of unit A, and the second unit B is attached to the first bonding site of the second group of the unit A.

The first unit B and the second unit B are groups that form a bond through a redox reaction between each other (see FIG. 1B). In other words, the first unit B and the second unit B are groups that form a bond by accepting electrons from outside (reduced), or groups that release the bonding by releasing electrons to outside (oxidized).

The units B (first unit B and second unit B) are not particularly limited, as long as a bond is formed by the redox reaction between units B (first unit B and second unit B). Preferably, units B (first unit B and second unit B) are groups represented by the formula (4) below. In this way, the units B can easily switch between the bonded state and the non-bonded state in a reversible fashion under adjusted reaction conditions. Further, because of high reactivity, the stimulus-responsive compound can undergo deformation even more smoothly at even lower voltage.

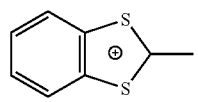
(4)

As illustrated in FIG. 1A, the stimulus-responsive compound also includes a liquid-crystalline functional group. The liquid-crystalline functional group has certain orientation imparted by using a liquid crystal orientation technique. The stimulus-responsive compound therefore has certain driving directivity.

The liquid-crystalline functional group is not particularly limited, as long as it is a group with liquid-crystalline properties. Examples include groups having a plurality of ring structures, for example, such as groups that have a plurality of phenyl groups joined by an ester group, and groups that have benzene rings or cyclohexane rings directly joined to each other.

Particularly, the liquid-crystalline functional group is preferably one in which one or more halogen atoms are attached to one of the ring structures. This improves the kinetic performance of the liquid-crystalline functional group during orientation, and thus increases the transition rate of orientation. As a result, the stimulus-responsive compound can undergo deformation (displacement) even more quickly and smoothly, and can thus be driven at even lower voltage.

Note that the present embodiment has been described through the case that the liquid-crystalline functional group is attached to only one of the alkyl chains. However, the invention is not limited to this, and the liquid-crystalline functional group may be attached to the both alkyl chains.

The following represents specific examples of the liquid-crystalline functional group.

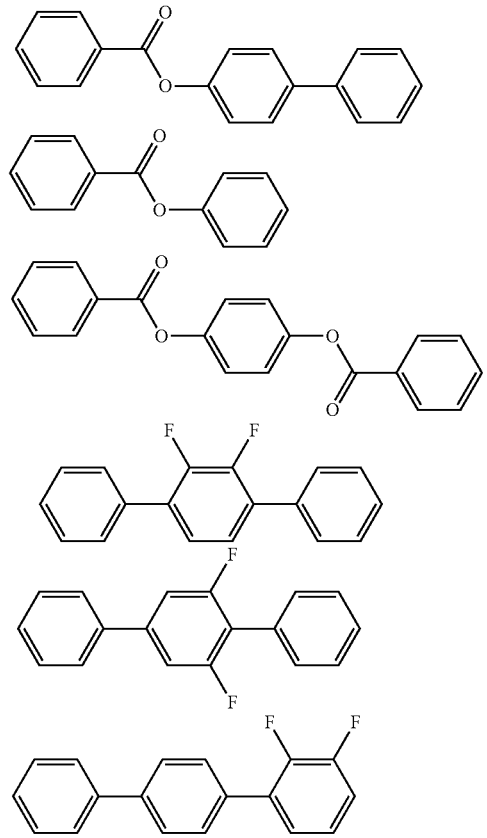
(5)

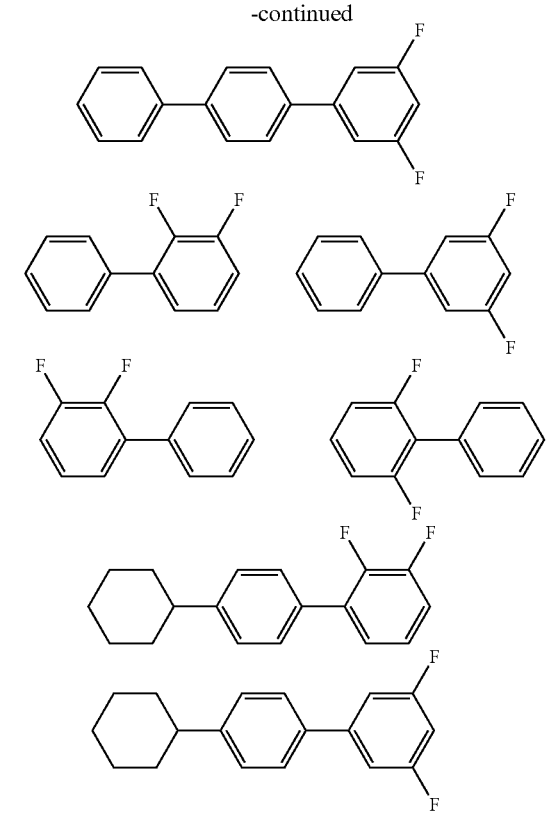

As described above, the stimulus-responsive compound of the embodiment of the invention includes a pair of alkyl chains; a crosslinking portion that includes unit A rotatable about the axis, and units B that can form a bond between each other through redox reaction (first unit B and second unit B); and a liquid-crystalline functional group. With this configuration, the stimulus-responsive compound can undergo deformation (displacement) at low power, and the extent of displacement can be relatively increased. This is considered to be due to the following reason.

The liquid-crystalline functional group allows a plurality of stimulus-responsive compound molecules to be oriented (aligned). In response to a voltage or other stimuli applied in the aligned state, the unit A rotates about the axis, and the units B forms a bond within the molecule through redox reaction (crosslinked). The orientation (liquid crystal properties) of the liquid-crystalline functional group, combined with the stimulus-induced bonding of units B, ensures deformation (displacement) from the state of FIG. 1A to the state of FIG. 1B. Because the orientation of the liquid-crystalline functional group and the bonding between the units B proceed at low voltage, a large deformation (displacement) is possible at low voltage.

Stimulus-Responsive Compound Producing Process

A process for producing the stimulus-responsive compound is described below.

The stimulus-responsive compound can be produced by copolymerizing a first monomer and a second monomer in arbitrary proportions. The first monomer includes the unit A, the first unit B disposed at the first bonding site of the first group of unit A, the second unit B disposed at the first bonding site of the second group of unit A, and a polymerizable functional group attached to a second bonding site of the first group of unit A, and to a second bonding site of the second group of unit A. The second monomer includes the liquid-crystalline functional group and at least one polymerizable functional group.

The polymerizable functional group is not particularly limited, and is preferably at least one selected from the group consisting of a vinyl group, an acryl group, and a methacryl group. In this way, the stimulus-responsive compound can be obtained more easily. Further, using these groups improves the mobility of the resulting stimulus-responsive compound, and the extent of deformation (deformation rate). For example, the following formulae (6) to (8) represent specific examples of the first monomer.

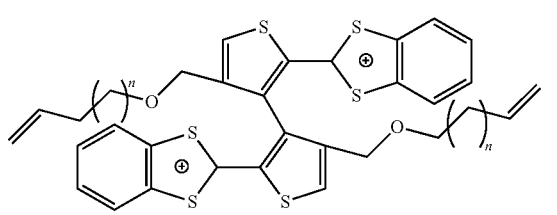

(6)

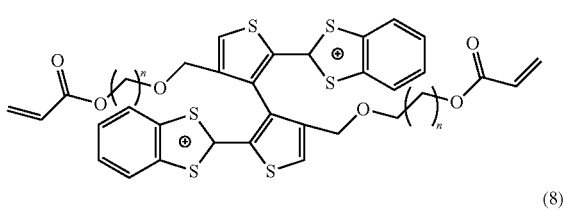

(7)

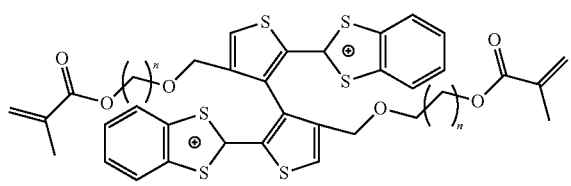

(8)

For example, the following formulae (9) to (11) represent specific examples of the second monomer.

Actuator

An actuator using the stimulus-responsive compound is described below in detail.

Figure 2:
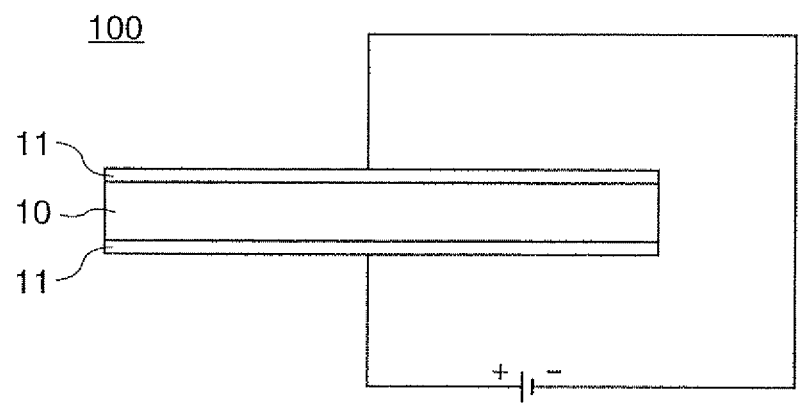
FIG. 2 is a cross sectional view schematically illustrating an example of an actuator that uses the stimulus-responsive compound of the embodiment of the invention.
Figure 3:
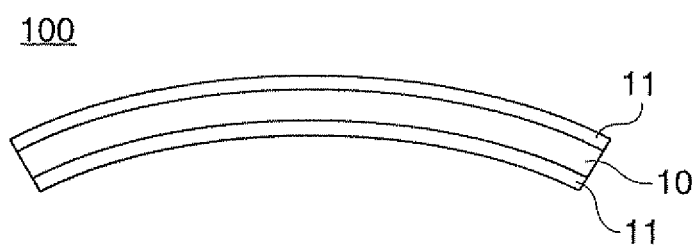
FIG. 3 is a cross sectional view representing an example of the actuator deformed in response to applied voltage.

FIG. 2 is a cross sectional view schematically illustrating an example of an actuator that uses the stimulus-responsive compound of the embodiment of the invention. FIG. 3 is a cross sectional view representing the actuator deformed in response to applied voltage.

As illustrated in FIG. 2, an actuator 100 includes a stimulus-responsive compound layer 10 configured from the stimulus-responsive compound of the embodiment of the invention, and electrodes 11 provided on the both surfaces of the stimulus-responsive compound layer 10. Specifically, the actuator 100 is structured to include the stimulus-responsive compound layer 10 sandwiched between the electrodes 11.

The stimulus-responsive compound layer 10 is a layer configured from the stimulus-responsive compound, and that deforms in response to applied voltage.

The electrodes 11 serve to apply voltage to the stimulus-responsive compound layer 10.

Further, the electrodes 11 are bendable, and deform with the stimulus-responsive compound layer 10.

The surfaces of the electrodes 11 in contact with the stimulus-responsive compound layer 10 are subjected to an orientation treatment such as rubbing. In this way, the liquid-crystalline functional group of the stimulus-responsive compound can be desirably oriented. Further, anisotropy can be imparted to the deformation (expansion and contraction) of the stimulus-responsive compound layer 10.

The material used to form the electrodes 11 is not particularly limited, and preferably carbon nanotubes are used. In this way, the electrodes 11 can more reliably deform with the stimulus-responsive compound layer 10.

In the actuator 100 structured as above, applying a voltage to the electrodes 11 promotes oxidation reaction and causes the stimulus-responsive compound layer 10 to expand on the

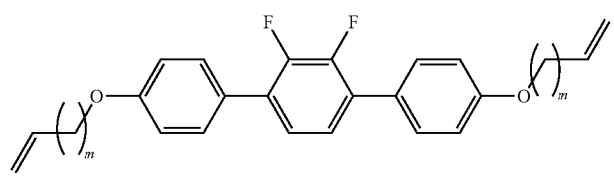

(9)

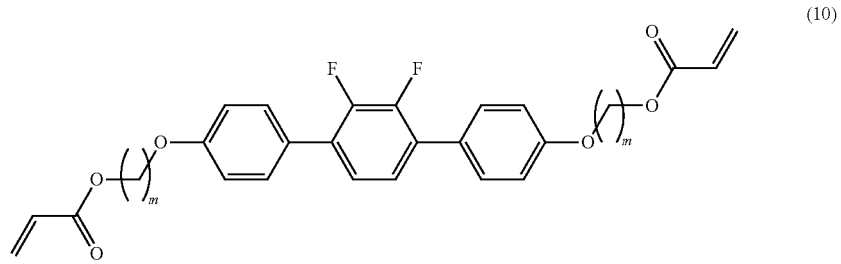

(10)

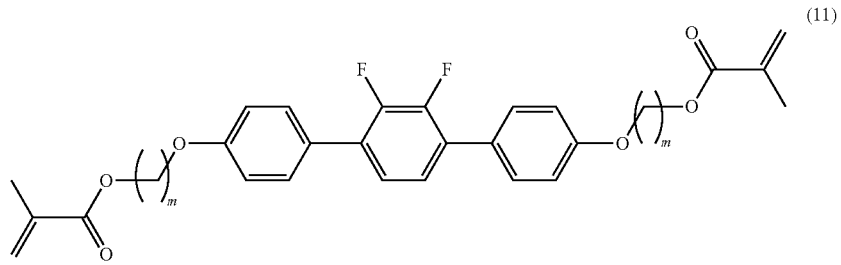

(11)

side in contact with one of the electrodes 11, while reduction reaction proceeds and the stimulus-responsive compound layer 10 contracts on the side in contact with the other electrode 11. As a result, as illustrated in FIG. 3, the stimulus-responsive compound layer 10 bends towards the side where the reduction reaction occurred.

While the invention has been described based on the preferred embodiment, the invention is in no way limited by the foregoing descriptions.

EXAMPLES

The invention is described below in more detail based on Examples. The invention, however, is not limited by the following Examples.

Example 1

An actuator of the structure shown in FIG. 3 was fabricated using the stimulus-responsive compound.

For the production of the actuator, the stimulus-responsive compound was dissolved in a solvent, and applied onto a petri dish and dried. The dried product (stimulus-responsive compound layer) was cut into a 3 cm×2 cm size, and gold was sputtered onto the both surfaces of the stimulus-responsive compound layer using a sputtering machine designed to prepare samples for electron scanning microscopy. The actuator was completed upon fixing the sputtered gold. Sputtering was performed at 10 mA for 30 min on each side.

The stimulus-responsive compound used was synthesized as follows.

Production of Stimulus-Responsive Compound

A compound of the formula (6) above was prepared as the first monomer.

As the second monomer, a compound of the formula (9) above was prepared.

The first monomer, the second monomer, a polymerization initiator, and azobis(isobutyronitrile) (AIBN, 1 mol %) were dissolved in toluene, and stirred overnight under ultraviolet light irradiation.

Thereafter, the reaction solution was added to methanol, and the precipitates were collected.

The precipitates were then dissolved in tetrahydrofuran, and added to methanol. This procedure was repeated until there was no residual monomer, and the product was dried.

As a result, the stimulus-responsive compound was obtained.

Example 2

A stimulus-responsive compound was produced in the same manner as in Example 1, except that compounds of the formulae (7) and (10) were used as the first and second monomers, respectively, and an actuator of the structure shown in FIG. 3 was fabricated as in Example 1.

Example 3

A stimulus-responsive compound was produced in the same manner as in Example 1, except that compounds of the formulae (8) and (11) were used as the first and second monomers, respectively, and an actuator of the structure shown in FIG. 3 was fabricated as in Example 1.

Comparative Example 25 mg of monolayer carbon nanotubes (HiPco, Carbon Nanotechnologies, Inc.; Fe content, 14 weight %; hereinafter also referred to as SWNT), 25 ml of 5 weight % Nafion solution (Aldrich, a mixed solvent of low molecular straight-chain alcohol and 10% water), and 25 ml of the reagent guaranteed methanol were weighed and mixed in a beaker, and subjected to ultrasonic waves for at least 10 hours in a ultrasonic wave washer to prepare a mixed dispersion of SWNT and Nafion. The dispersion was cast onto a glass petri dish, and allowed to stand for at least a whole day in a draft chamber to remove the solvent. After removing the solvent, the product was subjected to a heat treatment at 150° C. for 4 hours. The resulting composite film of SWNT and Nafion was peeled off from the petri dish, and cut into a 3 cm×2 cm size. Gold was then sputtered on the both surfaces of the composite film using a sputtering machine designed to prepare samples for electron scanning microscopy. The actuator was completed upon fixing the sputtered gold. Sputtering was performed at 10 mA for 30 min on each side.

Responsiveness Evaluation

For the evaluation of responsiveness, the actuators of Examples and Comparative Example were cut into strips to obtain test pieces (1 mm×15 mm). With a 3-mm portion at one end of the test piece held by an electrode-equipped holder, a voltage of 5 V was applied in air, and a displacement 10 mm away from the fixed end was measured using a laser displacement gauge.

While a large displacement was observed in the actuators that used the stimulus-responsive compound of the embodiment of the invention, the extent of displacement was smaller in the actuator of Comparative Example.

What is claimed is:

1. A stimulus responsive compound, comprising:
    a first alkyl chain;
    a second alkyl chain;
    a crosslinking portion that crosslinks the first alkyl chain and the second alkyl chain; and
    a liquid crystalline functional group attached to at least one of the first alkyl chain or the second alkyl chain,
        the crosslinking portion including:
            a unit A that has a bond that serves as a rotational axis, a first group positioned at one end of the bond, and a second group positioned at the other end of the bond,
            a first unit B disposed at a first bonding site of the first group, and
            a second unit B disposed at a first bonding site of the second group,
        the crosslinking portion being attached to one of the first alkyl chain or the second alkyl chain at a second bonding site of the first group, and to the other one of the first alkyl chain or the second alkyl chain at a second bonding site of the second group,
        the first unit B and the second unit B being capable of forming a bond by reduction reaction, wherein
        the first unit B and the second unit B are represented by the following formula (4)

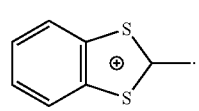

(4)

2. The stimulus responsive compound according to claim 1, the unit A being one selected from the group consisting of the following formulae (1), (2), and (3)

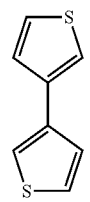 (1)

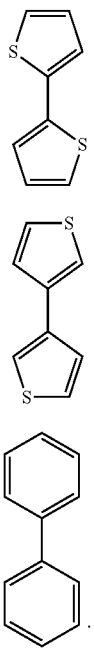 (2)

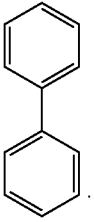 (3)

3. The stimulus responsive compound according to claim 1, the liquid crystalline functional group having a plurality of ring structures.

4. The stimulus responsive compound according to claim 3, a halogen atom being attached to one of the plurality of ring structures.

5. An actuator produced by using the stimulus responsive compound of claim 1.

6. An actuator produced by using the stimulus responsive compound of claim 2.

7. An actuator produced by using the stimulus responsive compound of claim 3.

8. An actuator produced by using the stimulus responsive compound of claim 4.

9. A method of producing a stimulus responsive compound, comprising:
copolymerizing a first monomer and a second monomer, the first monomer including:
a unit A that includes a bond that serves as a rotational axis, a first group positioned at one end of the bond, and a second group positioned at the other end of the bond,
a first unit B disposed at a first bonding site of the first group,
a second unit B disposed at a first bonding site of the second group, and
a polymerizable functional group attached to a second bonding site of the first group, and to a second bonding site of the second group,
the second monomer including a liquid crystalline functional group, and at least one polymerizable functional group, and
the first unit B and the second unit B being represented by the following formula (4)

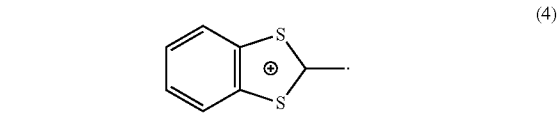 (4)

10. The process according to claim 9, the polymerizable functional group being at least one selected from a group consisting of a vinyl group, an acryl group, and a methacryl group.

* * * * *